United States Patent [19]

Conley

[11] Patent Number: 5,524,740
[45] Date of Patent: Jun. 11, 1996

[54] CONVEYOR ROLLER

[76] Inventor: Ronald L. Conley, 531 S. Gay St, Suite 400, Knoxville, Tenn. 37902

[21] Appl. No.: 414,229

[22] Filed: Mar. 31, 1995

[51] Int. Cl.⁶ .................................................. B65G 13/00
[52] U.S. Cl. ................................. 193/37; 198/500; 492/16
[58] Field of Search ..................................... 198/500, 501; 193/37; 492/16–20, 47

[56] References Cited

U.S. PATENT DOCUMENTS

| | | | |
|---|---|---|---|
| 3,349,462 | 10/1967 | Mott | 492/16 |
| 4,603,458 | 8/1986 | Hirohata | 492/16 X |
| 4,760,631 | 8/1988 | Brendel . | |
| 4,903,820 | 2/1990 | Fyfe | 198/501 |
| 5,308,307 | 5/1994 | Morel et al. . | |

FOREIGN PATENT DOCUMENTS 3703299  8/1988  Germany .................................. 193/37

*Primary Examiner*—James R. Bidwell
*Attorney, Agent, or Firm*—Cushman Darby & Cushman

[57] ABSTRACT

A conveyor roller is provided including a first, elongated hollow cylindrical member having opposing ends. A second, elongated cylindrical member is disposed concentrically within the first cylindrical member has opposing ends and an outside diameter smaller than an inside diameter of the first cylindrical member so as to define a gap between an outer peripheral surface of the cylindrical member and an inner peripheral surface of the first cylindrical member. Shaft structure is coupled to the second elongated cylinder so as to extend beyond the ends thereof. Fluid lubricant is in the gap. Retaining structure is constructed and arranged to retain the second cylindrical member within the first cylindrical member in such a manner that the first cylindrical member may rotate freely about the second cylindrical member upon the fluid lubricant.

8 Claims, 1 Drawing Sheet

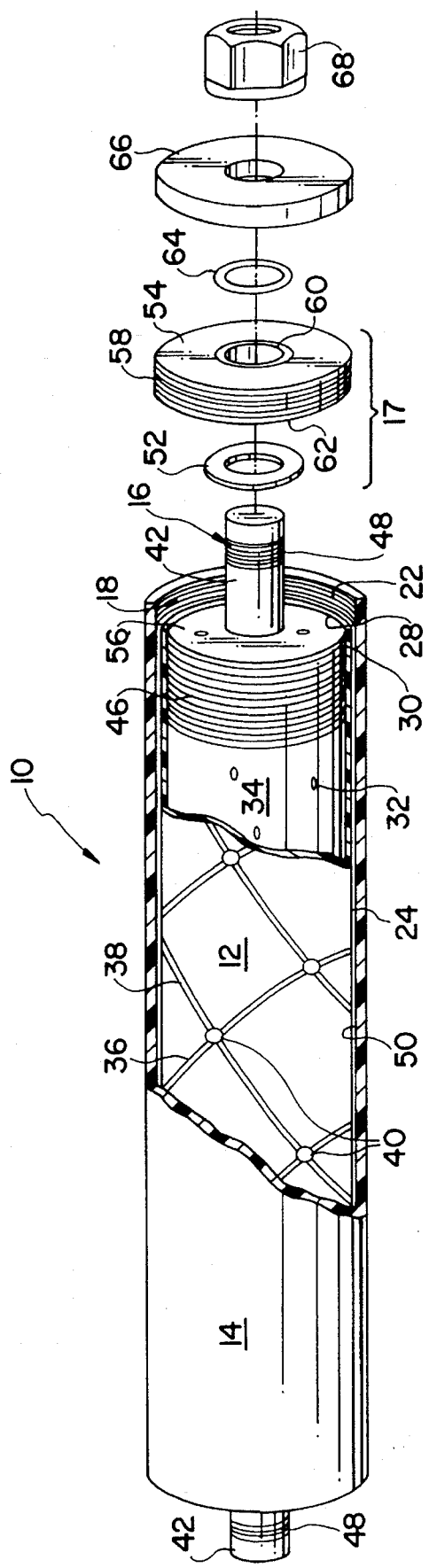

CONVEYOR ROLLER

BACKGROUND OF THE INVENTION

This invention relates to a conveyor roller, and in particular, to a conveyor roller requiring no roller bearings.

Conventional conveyor rollers include a shaft fixed to a conveyor support structure and a generally cylindrical canister mounted for rotation about the shaft via bearings. Generally, failure of the bearings results in failure of the conveyor roller. Further, the bearings must be maintained, requiring scheduled greasing which increase maintenance costs of the conveyor roller.

Accordingly, it can be appreciated that a need exists to provide a conveyor roller which has no roller bearings and thus, does not exhibit the problems associated with the conventional rollers.

SUMMARY OF THE INVENTION

An object of the present invention is to fulfill the need referred to above. In accordance with the principles of the present invention, this objective is obtained by providing a conveyor roller including a first, elongated hollow cylindrical member having opposing ends. A second, elongated cylindrical member is disposed concentrically within the first cylindrical member and has opposing ends and an outside diameter smaller than an inside diameter of the first cylindrical member so as to define a gap between an outer peripheral surface of the cylindrical member and an inner peripheral surface of the first cylindrical member. Shaft structure is coupled to the second elongated cylinder so as to extend beyond the ends thereof. Fluid lubricant is in the gap. Retaining structure is constructed and arranged to retain the second cylindrical member within the first cylindrical member in such a manner that the first cylindrical member may rotate freely about the second cylindrical member upon the fluid lubricant.

Other objects, features and characteristics of the present invention, as well as the function of the related elements of the structure, and the combination of parts and economies of manufacture, will become more apparent upon consideration of the following detailed description and the appended claims with reference to the accompanying drawing all of which form a part of this specification.

The drawing is an exploded prospective view of the conveyor roller, provided in accordance with the principles of the present invention, shown with parts broken away for clarity of illustration.

DETAILED DESCRIPTION OF THE PRESENTLY PREFERRED EXEMPLARY EMBODIMENT

Referring now to the drawing, a conveyor roller is shown, generally indicated at 10, which embodies the principles of the present invention. The conveyor roller 10 includes an inner, elongated hollow cylindrical member 12, an outer, elongated cylindrical member 14 mounted for rotation about the inner cylindrical member 12, shaft structure, generally indicated at 16 for mounting the conveyor roller 10 to a conventional conveyor support structure (not shown), and retaining structure 17 for retaining the inner cylindrical member 12 within the outer cylindrical member 14.

It can be appreciated that the drawing is an exploded perspective view showing the details of one end of the conveyor roller 10. The opposite end of the conveyor roller 10 is configured identically.

The outer cylindrical member 14 is preferably made from polyvinylchloride (PVC) or other suitable plastic material and has open opposing ends. A portion of each end 18 includes internal threads 22 defined therein, the function of which will become apparent below.

The inner cylindrical member 12 is disposed concentrically within the outer cylindrical member 14 and has an outside diameter smaller than the inside diameter of the outer cylindrical member 14 so as to define a gap 24 between an outer peripheral surface of the inner cylindrical member 12 and an inner peripheral surface of the outer cylindrical member 14. The inner member 12 is also preferably composed of PVC material, and, like the outer member 14, has open opposing ends. Each end 28 includes internal threads 30 therein. At least one oil fill hole 32 is provided in the inner member 12 extending through the peripheral surface thereof so as to communicate with an internal space 34 of the hollow inner member 12. The peripheral surface of the inner member 12 includes a pair of generally helically arranged grooves, 36, 38 therein. A plurality of bores 40 are provided through the peripheral surface of the inner member 12 at locations where the grooves 36 and 38 intersect, the function of which will become apparent below.

As shown, the shaft structure 16 includes a pair of shaft assemblies 42, each assembly including an externally threaded end cap 46 and a shaft 48 engaged therewith and extending axially therefrom. Thus, the shafts 48 extend beyond the ends of the cylindrical members for mounting the conveyor roller 10 to support structure (not shown). The externally threaded end caps 46 are threadedly engaged with the internal threads 30 of the inner member 12 coupling the shaft assemblies 42 to the inner member 12 in such a manner that the shafts 48 are disposed in opposing relation. Once the shaft assemblies 42 are coupled with the inner member 12, a fluid lubricant 50, such as oil, is inserted through the fill hole 32 so as to fill the internal space 34 of the inner member 12 with lubricant.

The retaining structure 17, comprising a pair of post cap assemblies including a seal ring 52 and a cap nut 54, is associated with each shaft assembly 42. As shown, the seal ring 52 has an inner diameter sized to receive the shaft 48 therein. The seal ring 52 is arranged to be flush with the adjacent surface 56 of the end cap 46. The cap nut 54 is of generally disc-shaped configuration having external threads 58 and a bore 60 disposed axially therethrough. The bore 60 is sized so as to be fitted over the shaft 48. Once the post cap nut 54 is disposed over an associated shaft 48 of the shaft assembly 42, the cap nut 54 is engaged with the internal threads 22 of the outer member 14 so that the seal ring 52 is sandwiched between surface 56 of the end cap 46 and the inner surface 62 of the cap nut 54. Thus, oil within the inner member 12 cannot escape through the ends of the conveyor roller 10 and the inner member 12 is retained in the outer member 14. To ease assembly and proper seal, surface 62 of cap nut 54 may include a groove for housing the seal ring 52 therein, in such a manner that the seal ring 52 may be compressed upon assembly.

The operation of the conveyor roller 10 will be appreciated from the following discussion. Gravity forces the fluid lubricant 50 through the bores 40 and into the gap 24 defined between the inner member 12 and the outer member 14. The grooves 36, 38 deliver the lubricant 50 to the wear surfaces between the inner member 12 and outer member 14. The lubricant 50 is placed in the conveyor roller 10 during manufacturing and sealed as described above, such that the lubricant 50 need not be replaced or replenished during the life of the roller 10, which eliminates any required maintenance. Thus, the outer member 14 is freely rotatable about the fixed inner member 12, since the outer member 14 rides on the lubricant 50.

Since the shafts 48 of the shaft assemblies 42 are screwed into end caps 46, the shafts 48 may be interchangeable to easily adapt to any roller support structure. Further, the size of the roller 10 advantageously may be made smaller than conventional rollers, since there is no need to house an independent roller bearing therein.

As shown, if the roller is used during extreme services, an optional O-ring 64, ring washer 66 and nut 68, may be provided for a more secure sealing of the lubricant. The nut 68 is cooperable with the threads of the shaft 48.

It can be seen that the objects of the invention have been fully and effectively accomplished. The conveyor roller 10 is economical, durable, lightweight and inexpensive to manufacture and maintain.

While the invention has been described in connection with what is presently considered to be the most practical and preferred embodiment, it is understood that the invention is not limited to the disclosed embodiment, but, on the contrary, is intended to cover various modifications and equivalent arrangements included within the spirit of the scope of the appended claims.

What is claimed is:

1. A conveyor roller comprising:

a first, elongated hollow cylindrical member having opposing ends, a second, elongated cylindrical member disposed concentrically within said first cylindrical member having opposing ends and an outside diameter smaller than an inside diameter of said first cylindrical member so as to define a gap between an outer peripheral surface of the second cylindrical member and an inner peripheral surface of said first cylindrical member;

shaft structure coupled to said second elongated cylinder so as to extend beyond said ends thereof;

fluid lubricant in said gap; and retaining structure constructed and arranged (1) to retain said second cylindrical member within said first cylindrical member in such a manner that said first cylindrical member may rotate freely about said second cylindrical member upon said fluid lubricant and (2) to prevent said fluid lubricant from escaping from said opposing ends of said first cylindrical member.

2. The conveyor roller according to claim 1, wherein said second cylindrical member is hollow defining an internal space, said lubricant being housed in said internal space, bores being provided in the outer peripheral surface of said second cylindrical member such that said fluid lubricant in said internal space communicates with said gap.

3. The conveyor roller according to claim 2, wherein the outer peripheral surface of said second cylindrical member includes at least one generally helical groove therein, said groove communicating with said bores so as to distribute said lubricant along an extent of said gap.

4. The conveyor roller according to claim 1, wherein said shaft structure includes a pair of shaft assemblies, each shaft assembly including an externally threaded end cap and a shaft mounted thereto and extending therefrom, each end of said second cylindrical member having internal threads therein engaging external threads of an associated end cap such that said shafts extend from said ends of said second cylindrical member in opposing relation.

5. The conveyor roller according to claim 4, wherein said retaining structure comprises a pair of post cap assemblies, one post cap assembly being mounted at each of said ends of said first cylindrical member.

6. The conveyor roller according to claim 5, wherein each post cap assembly includes a seal ring and an externally threaded cap nut, each of said ends of said first cylindrical member being internally threaded such that said external threads of said cap nuts engage internal threads of said first cylindrical member, each said cap nut including a bore therethrough for receiving said shaft, said seal ring being disposed between a surface of said end cap and an end surface of said cap nut.

7. The conveyor roller according to claim 1, wherein said first and second cylindrical members comprise polyvinylchloride.

8. The conveyor roller according to claim 3, wherein a pair of helical grooves are provided such that said grooves intersect at various points along said outer peripheral surface of said second cylindrical member.

* * * * *